Figure 1:
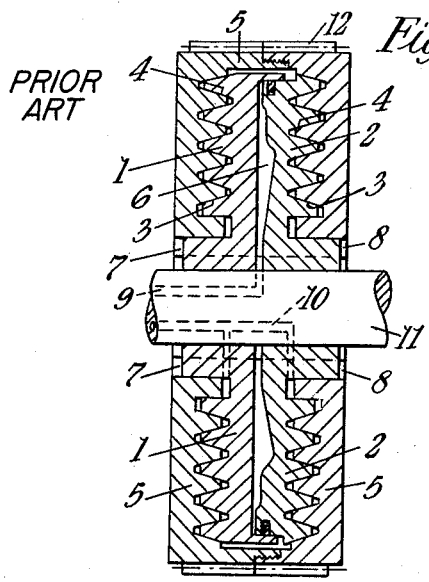

Nov. 29, 1960  T. HINDMARCH  2,962,146
FLUID PRESSURE-OPERATED CLUTCHES WITH
METAL TO METAL FRICTION SURFACES
Filed Aug. 19, 1959

Inventor
T. Hindmarch
By Mason Downing Seebold
Attys

United States Patent Office 2,962,146
Patented Nov. 29, 1960

2,962,146

FLUID PRESSURE-OPERATED CLUTCHES WITH METAL TO METAL FRICTION SURFACES

Thomas Hindmarch, Lindo Lodge, Stanley Ave., Chesham, England

Filed Aug. 19, 1959, Ser. No. 834,718

Claims priority, application Great Britain Aug. 29, 1958

5 Claims. (Cl. 192—86)

The invention relates to fluid pressure operated clutches with metal to metal friction surfaces of the kind comprising a hollow outer clutch member and a pair of disc-like inner clutch members mounted back to back upon a shaft and within said outer clutch member adapted to be moved away from one another under fluid pressure to contact with their friction surfaces corresponding friction surfaces upon the outer clutch member to engage the clutch.

When clutches of the kind above referred to, have been required to transmit torques in marine, locomotive and industrial transmissions, the co-acting friction surfaces have been constructed with concentrically rigid V-grooved inter-engaging surfaces so that the wedge-shaped ridges of one part fit into the similar and cooperating grooves in the other part on the principle that for a given diameter an increased area of surface contact is thereby obtained with resultant diminution of surface stress.

Also, in these clutches it is well known that dissimilar metals must be employed for the sake of compatibilities of the rubbing surfaces. It has, therefore, become customary to form the outer clutch member in ferrous metal and the inner clutch members in non-ferrous metal.

It is also proposed to construct the disc-like inner clutch members so as to be capable of telescopic engagement with one another so as to provide a fluid pressure chamber between the members which chamber is expanded to engage the clutch. Other chambers may be provided for disengagement of the clutch. The pressure fluid used for engagement may be caused to flow continuously through the engaging chambers and thus assist in preventing excessive rise in temperature due to the production of heat when the clutch slips.

The above-mentioned form of metal to metal clutch has proved satisfactory up till now when used for the transmission of moderately large torques, but the demand for the transmission of higher and higher torques has emphasised its limitations in one particular direction.

Normally, one would need to increase the diameter of the inter-engaging surfaces of the clutch members in order to transmit higher torques than heretofore without over-stressing the said surfaces, but there is a limit to the diameter which can be employed in such clutches when constructed in the known manner.

The limit to the diameter which can be usefully employed in clutches of known construction results from the behaviour of V-grooves inter-engaging surfaces under the influence of heat. The co-efficient of linear expansion of non-ferrous metal is about 50% greater than the co-efficient of linear expansion of ferrous metal, and therefore the difference, in radial dimensions from the axis of rotation of the outer co-acting ridge and V-grooves upon the two inter-engaging friction members, due to the unequal expansion of the dissimilar metals, is greater and greater as the diameter of the clutch is increased. The consequence is that only the outer side of the non-ferrous ridge engages with the complementary V-groove in the ferrous metal when hot and being conical there is a tendency for the whole of the load to be taken on this part.

For example and considering two complementary discs respectively of ferrous and non-ferrous metal of say 12″ diameter in which the V-shaped concentric ridges of non-ferrous metal engaged with V-shaped concentric grooves of ferrous metal, the difference in linear expansion for 100° F. rise in temperature is approximately ⅓ of a thousandth of an inch per inch of radius. This means that the outer wedge-shaped ridge and groove are no longer in proper register when hot as the ridge has moved outwards approximately 2 thousandths of an inch from the apex of the groove. In consequence, the depth of penetration by the ridge into the groove is reduced by the amount of 2 thousandths multiplied by the reciprocal of the tangent of the angle of the cone formed by the sides of the ridge.

This amount is sufficient, assuming that there is no metal flexion, to prevent the inner surfaces of the ridge and groove making contact at all. Practical experience has shown that flexion of the non-ferrous metal, short of its elastic limit, does take place to some extent and contact of some kind is obtained by the intermediate ridges and grooves but to a lesser extent than when the ridges and grooves were brought together in a cold state.

Attempts to build larger size clutches, say of 24″ or 30″ or more diameter according to this wedge principle have proved to be quite unsuccessful. Following the same reasoning, it will be seen that the displacement of the outer ridge of non-ferrous metal on a 24″ radius would be 4 thousandths of an inch and that the entire load would have to be taken on the outer face of one wedge with proportionate increase in surface stress resulting in the surface firing and sticking.

There are many practical advantages attaching to an oil operated metal to metal clutch capable of being contained within the pinions of a multi-speed or reverse reduction gear box. Short thick shafts, rigidity of casing and general convenience render such a type of clutch much superior from an installational point than mechanical friction clutches which have an asbestos fabric friction material and springs and levers for engagement and dis-engagement and the necessity to keep the lubricating oil free from the detritus resulting from wear of friction fabrics.

The invention consists in an oil operated clutch having metal to metal inter-engaging disc-like friction members each having a different co-efficient of thermal expansion and both having a plurality of corresponding concentric rings of inter-engaging conical surfaces and the inner member or members of which clutch form part of the boundary of an operative telescopic oil pressure chamber characterised in that the engagement surfaces upon one member are facing away from the common axis while the engagement surfaces of the other member are facing towards said axis and the angles which said engagement conical faces make with the said axis are increased with increase of distance from said axis, thereby to minimise the alteration of area of contact between co-acting faces with change of temperature, freedom being allowed for variation in depth of engagement of the friction members corresponding to the heat range of the clutch.

The invention furthermore consists in a construction as set forth in the preceding paragraph in which the tangents of the angles which said surfaces make with the said axis are proportional to the distances of the surfaces from said axis.

The invention furthermore consists in a clutch of the kind referred to in which the engagement surfaces of the members of lower co-efficient of expansion are faced outward from said axis.

Figure 2:
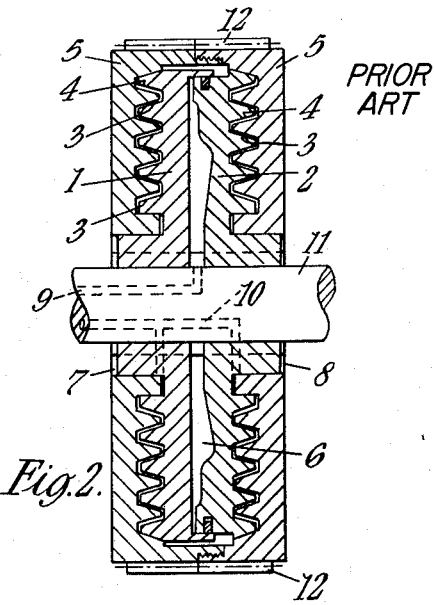
Figure 3:
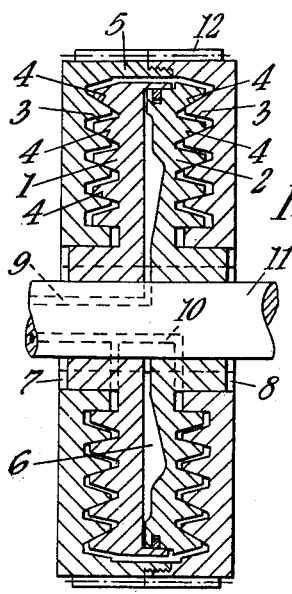
Figure 4:
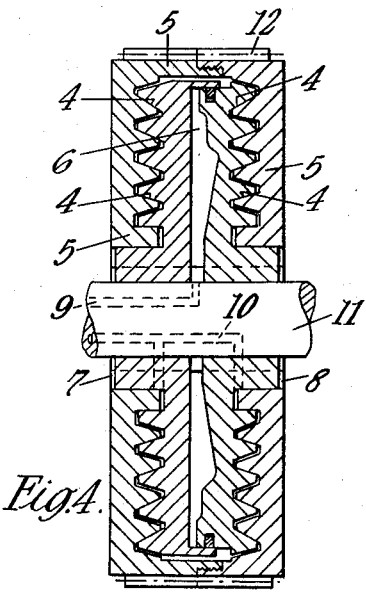

The accompanying drawings show diagrammatically, and by way of example only, metal to metal V-grooved friction clutches in which:

Figures 1 and 2 show a form of clutch when cold and hot respectively illustrating the disadvantages of the known form of construction, while Figures 3 and 4, show diagrammatically one form of construction in accordance with the invention, when cold and hot respectively illustrating one mode of overcoming the disadvantage of the construction of Figures 1 and 2.

Figures 1 and 2 show a known form of construction of metal to metal V-grooved friction clutch in which the inter-engaging surfaces are shaped during the manufacture when cold so that as intimate a contact as possible is obtained over the inter-engaging surfaces, the concentric wedge-shaped rings being provided, as previously described, on the principle that for a given diameter of clutch a maximum area of surface of contact is obtained.

The two inner disc-like members 1 and 2 are provided with conical surfaces 3 and 4 which co-act with similar surfaces upon the fixed member 5 so that, by the introduction of pressure fluid into the pressure chamber 6 between the movable clutch members 1 and 2 by way of the fluid channel 9 in the shaft 11, the latter are forced apart and contact is made between the friction surfaces upon the movable members and the fixed outer member. The clutch illustrated is dis-engaged by the application of pressure fluid to the disengaging chambers 7 and 8 by way of the fluid channel 10.

In some earlier forms of known construction every precaution has been taken to prevent the leakage of pressure fluid from the pressure chambers on to the friction surfaces with the idea of preventing slip, but in later forms of known construction the friction surfaces are well lubricated to prevent excessive heat and the destruction of the surfaces when the clutch is allowed to slip. The inner members are splined to the shaft to allow longitudinal movement without relative rotational movement, while the outer members may be provided with teeth 12 in the form of a pinion, the outer member being free to rotate in relation to the shaft on bearings on the latter, or in the casing for the clutch, when the clutch is dis-engaged, but is drivingly fixed to the shaft when the clutch is engaged.

On comparison between this known clutch when cold as shown in Figure 1 and when at its running temperature as shown in Figure 2 it can be seen that whereas intimate contact is made between all the co-acting conical surfaces on the longitudinally movable and fixed member when the clutch is cold, such intimate contact is not made when the clutch is hot by reason of the inner members being made of bronze and the outer member of steel, and they have different co-efficients of expansion.

When hot the inner members 1 and 2 are unable to engage with their concentric rings so deeply into the concentric grooves on the fixed member as the outer conical ring has expanded radially to a greater extent than that of the corresponding outer groove on the outer member. Consequently, only the outermost of the conical surfaces 3 make proper engagement, and all the other conical surfaces are prevented from mating.

When such a clutch is of moderate radius some contact is made between all the inter-engageable surfaces if the inner members are loaded sufficiently to make them flex, but of course the load is not evenly distributed between the rings. When such a clutch is made of considerable radius in order to be capable of transmitting substantial torques, such flexion of the inner members cannot be relied upon to correct for uneven expansion of the inter-engageable parts.

The mode of overcoming the difficulty experienced with the known form of construction is shown in Figures 3 and 4 in which the general form which the clutch takes is similar to the known form of clutch previously described but in which the inter-engaging conical surfaces are so modified as to provide intimate contact therebetween not only when cold and hot but at all temperatures therebetween. This is achieved by making use only of one conical surface upon each concentric ring on the inner members which engages one conical surface on the corresponding conical groove on the outer member and by making the angle which these surfaces make with the axis of rotation of the clutch progressively greater with distance from the axis.

As the non-ferrous member expands away from the ferrous member in each pair of engageable conical surfaces, the depth of engagement of the rings upon the inner members within the grooves in the outer member, by necessity, becomes deeper. However, by virtue of the graded angle of engagement, the greater degree of radial movement at the periphery due to expansion is compensated for and the inner and outer rings come into engagement simultaneously regardless of the temperature.

This measure of compensation for unequal expansion of the inner and outer members can be clearly understood if it is considered that if all the angles are the same, as in the previously known form of construction, the outer non-ferrous ring is displaced from its corresponding ferrous ring by an amount of say 4 thousandths of an inch, being proportional to its radius, while the inner non-ferrous ring is displaced from its corresponding ferrous ring by only 1 thousandth of an inch. If an increase of depth of engagement of 5 thousandths of an inch is sufficient to engage the inner ring, 20 thousandths of an inch increase of depth of engagement is necessary for the outer ring before contact is made.

These examples assume the tangent of the angle of the faces to be 0.200.

By progressive increase of the angle from the inside to the outside, the tangent of the angle is increased in proportion to the radius, so that for a given longitudinal movement all faces engage simultaneously. This permits constancy of engagement and an equal load spreading over the whole of the contact areas independent of the temperature of operation.

The form that the inter-engaging surfaces of the clutch members take may be seen from Figures 3 and 4, when cold and hot respectively, where it will be observed that all the conical friction surfaces 4 on the inner members are in contact with all the corresponding surfaces on the outer member at both temperatures. It can also be seen that only surfaces 4 are made use of to transmit torque and that the surfaces 3 and/or the corresponding surfaces on the outer member are relived so as to provide a clearance which is maintained throughout the range of operating temperatures. If desired, the angles provided for the rings may be varied slightly from their theoretically optimum values and reliance be placed upon the flexion of the inner members to achieve intimate contact at all running temperatures, to assist in economising in a practical design.

The surfaces of the relieved portions of the rings need not be conical as they do not make engagement with one another, their shape being determined by the necessity of making the root of each ring of adequate cross section to resist distortion or failure in load. Greatest strength is provided by a ring of approximately triangular shape.

As these rings are each relieved upon one side, a wedging action as was used in some of the prior constructions, is not provided and a copius supply of lubricant is maintained between the engageable surfaces to prevent damage when the clutch is allowed to slip. This also is beneficial in spreading the contact and conducting away heat, as a boundary layer of lubricant is retained even under full load.

It will now be understood from the above that the constructions proposed in accordance with the invention have concentric rings which do not rely upon wedge action as heretofore, and that the inter-engaging surfaces are copiously lubricated, that the inter-engaging surfaces make ever increasing angles with the axis of rotation with increase of radius and/or over increasing clearance with constant angle in a direction towards the axis and/or graduated ring spacings.

It is to be understood that the above description is by way of example only and that details for carrying the invention into effect may be varied without departing from the scope of the invention.

I claim:

1. A fluid operated clutch including a rotatable shaft, metal to metal inter-engaging inner and outer disc-like friction members on the rotatable shaft with the outer member rotatable on the shaft and the inner member secured to but axially movable along the shaft toward and away from the outer member for connecting and disconnecting the outer member to and from the shaft, respectively, each member having a different co-efficient of thermal expansion and a plurality of corresponding concentric rings provided with converging inner and outer surfaces adapted to inter-engage when the inner member is moved toward the outer member, the inner surface of each ring of the inner member engaging the outer surface of each ring of the outer member and the angles made by said engaging surfaces with the axis of rotation of the shaft increasing with the increase in distance from the axis of rotation of the shaft thereby minimizing the alteration of area of engagement between said surfaces with changes in temperature of the clutch thus allowing freedom for variation in depth of engagement of said members corresponding to the heat range of the clutch, and means cooperable with the inner member to provide a pressure fluid accommodating chamber operative upon the introduction of pressure fluid therein to move the inner member toward the outer member for effecting engagement of said surfaces.

2. A clutch as claimed in claim 1, wherein the tangents of the angles which said engaging surfaces make with the axis of rotation of the shaft are proportional to the distances of said engaging surfaces from the axis of rotation.

3. A clutch as claimed in claim 1, wherein the engaging surfaces of the member of lower co-efficient of thermal expansion face outward from the axis of rotation of the shaft.

4. A clutch as claimed in claim 1 wherein the engaging surfaces of the member of lower co-efficient of thermal expansion face inward toward the axis of rotation of the shaft.

5. A fluid operated clutch including a rotatable shaft, a pair of outer metal disc-like members rotatably mounted on the shaft, a pair of inner metal disc-like members mounted coaxially of the shaft for movement toward and away from said outer members for connecting and disconnecting the outer members to and from the shaft, respectively, said pairs of members having different co-efficients of thermal expansion and each pair of members having inner and outer faces, a plurality of corresponding concentric rings on the inner face of each outer member and the outer face of each inner member with each ring having converging inner and outer surfaces adapted to inter-engage when the inner members are moved toward the outer members, the inner surface of each ring of the inner members engaging the outer surface of each ring of the outer members and the angles made by said engaging surfaces with the axis of rotation of the shaft increasing with the increase in distance from the axis of rotation of the shaft thereby minimizing the alteration of area of engagement between said surfaces with changes in temperature of the clutch thus allowing freedom for variation in depth of engagement of said members corresponding to the heat range of the clutch, and the inner face of at least one of the inner members being shaped to provide a pressure fluid accommodating chamber operative upon the introduction of pressure fluid therein to move said inner members toward the outer members for effecting engagement of said surfaces.

References Cited in the file of this patent

UNITED STATES PATENTS

| | | |
|---|---|---|
| 1,872,986 | Lane | Aug. 23, 1932 |
| 2,087,488 | Stanley | July 30, 1937 |
| 2,699,846 | Pitman et al. | Jan. 18, 1955 |
| 2,791,306 | Hindmarch | May 7, 1957 |